Jan. 1, 1946.  B. HORSFIELD  2,392,044
ELECTROSTATIC SEPARATION OF MATERIAL PARTICLES
Original Filed June 14, 1939  6 Sheets-Sheet 2
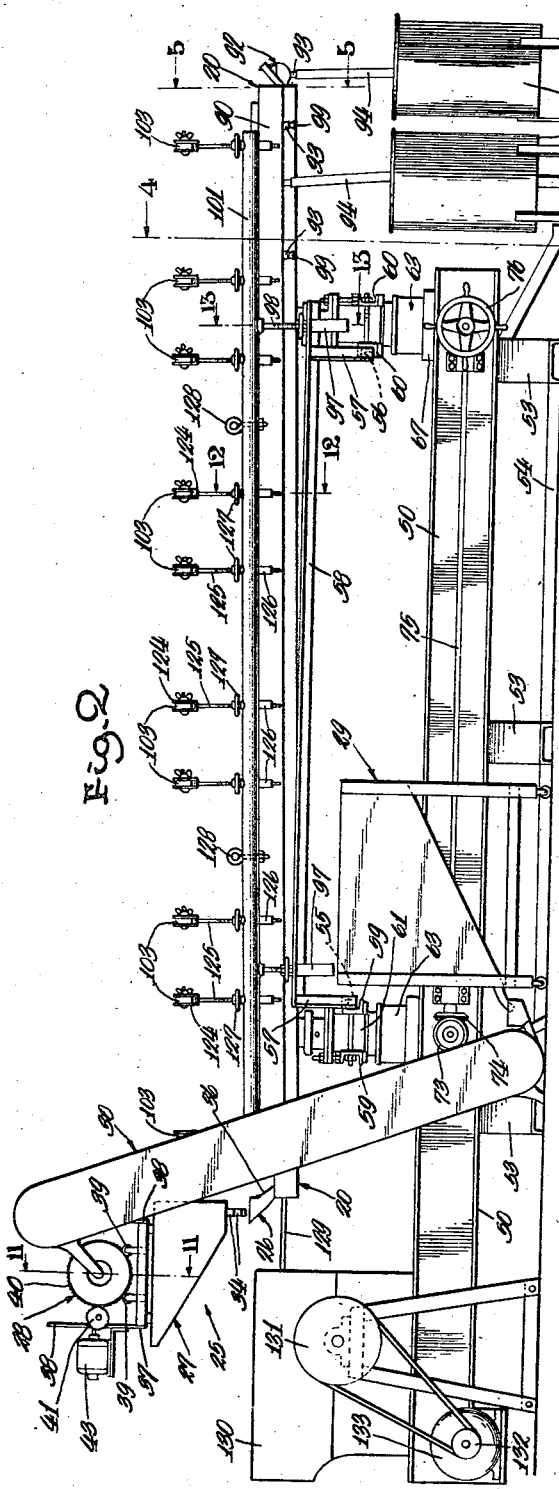
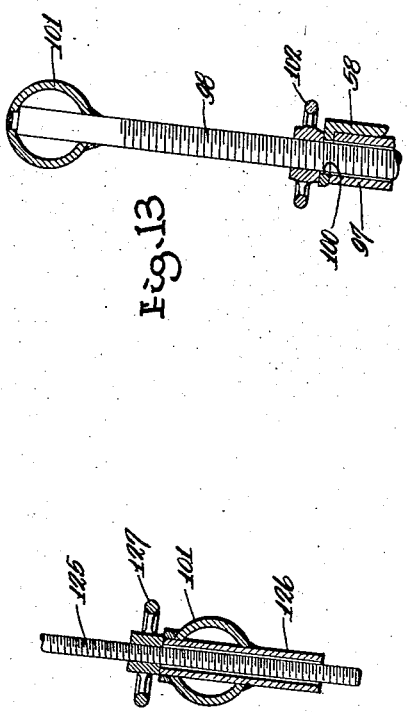
Basil Horsfield
INVENTOR
BY Freeman Albrecht and Williams
ATTORNEYS

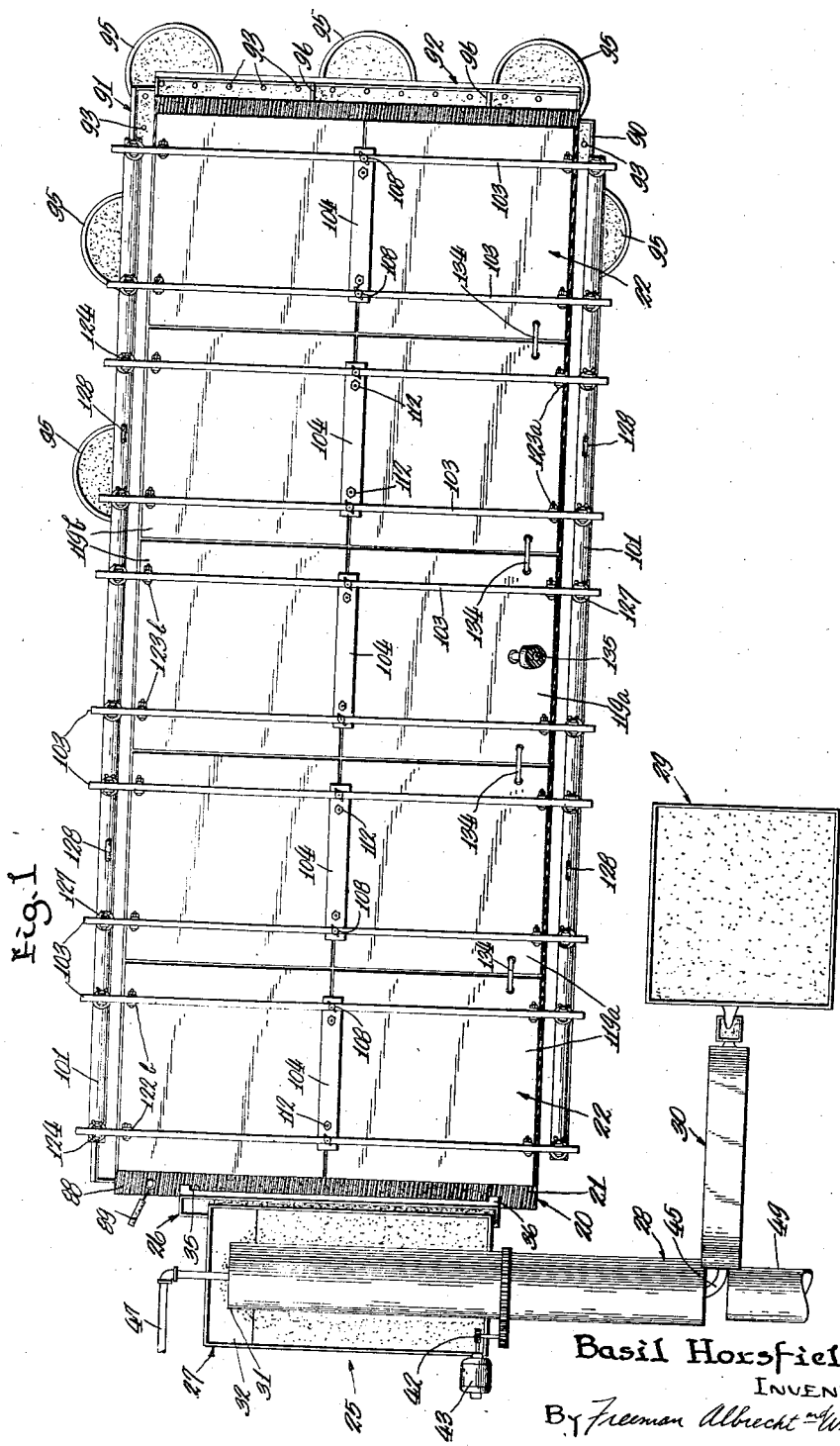

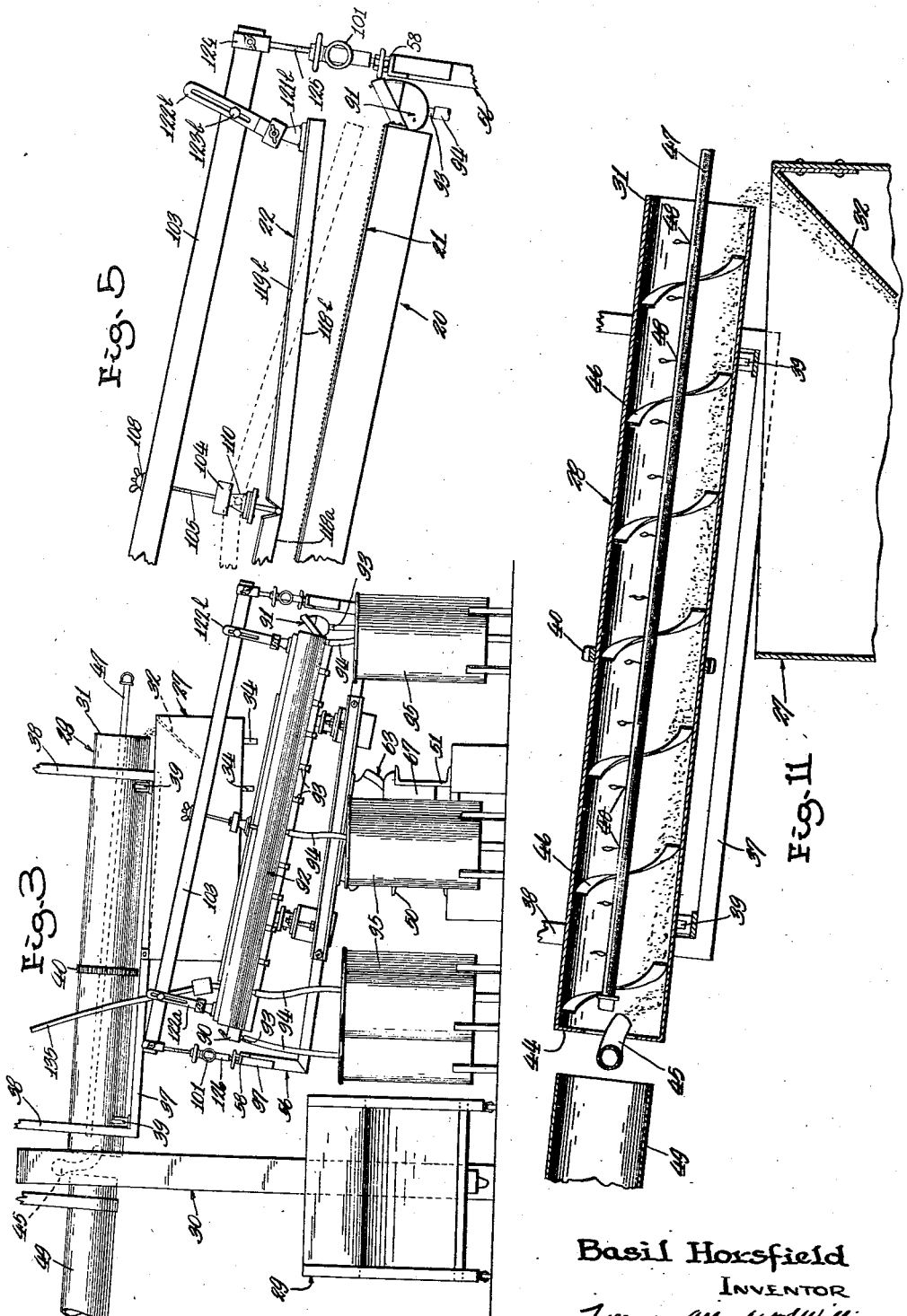

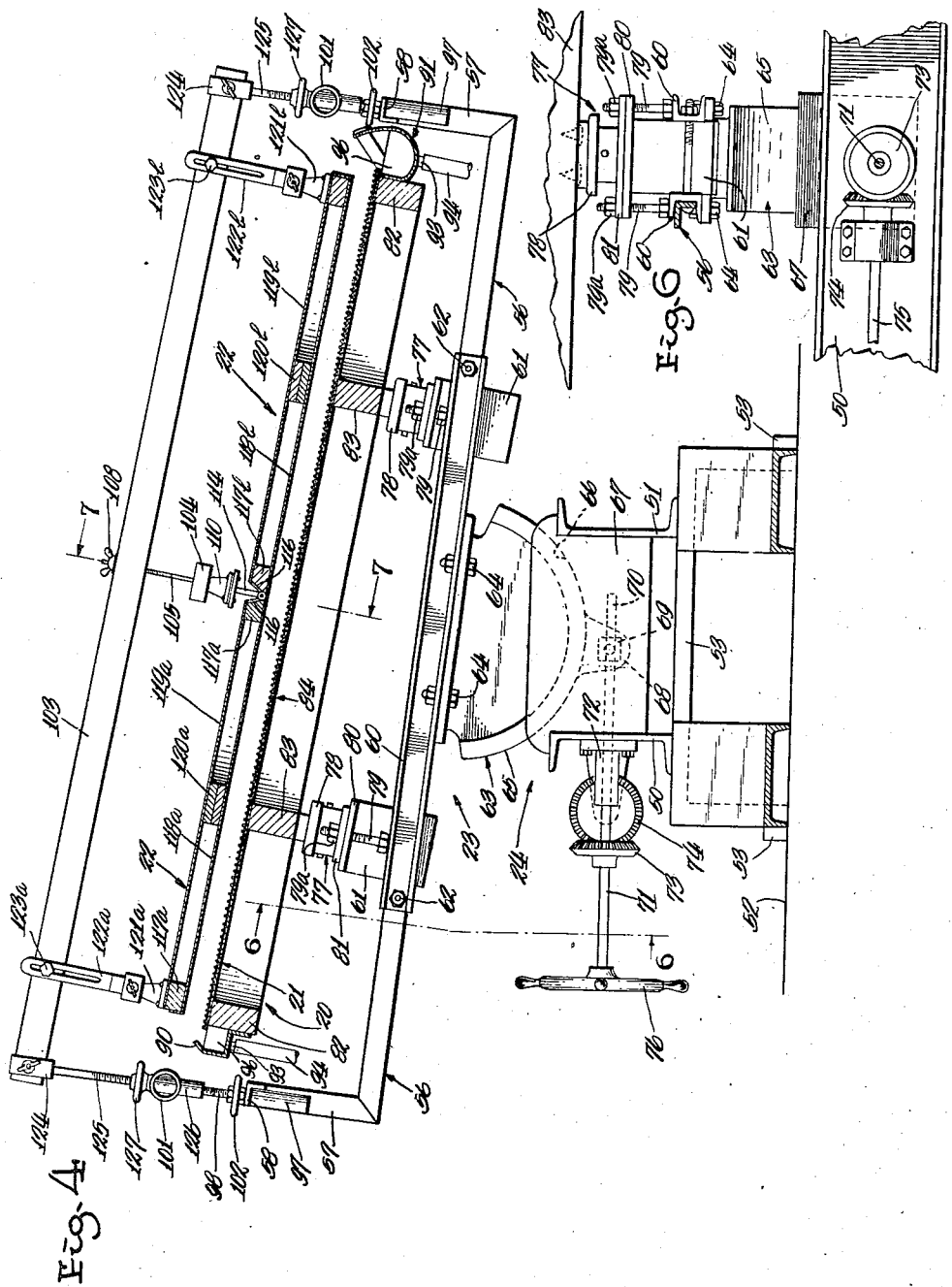

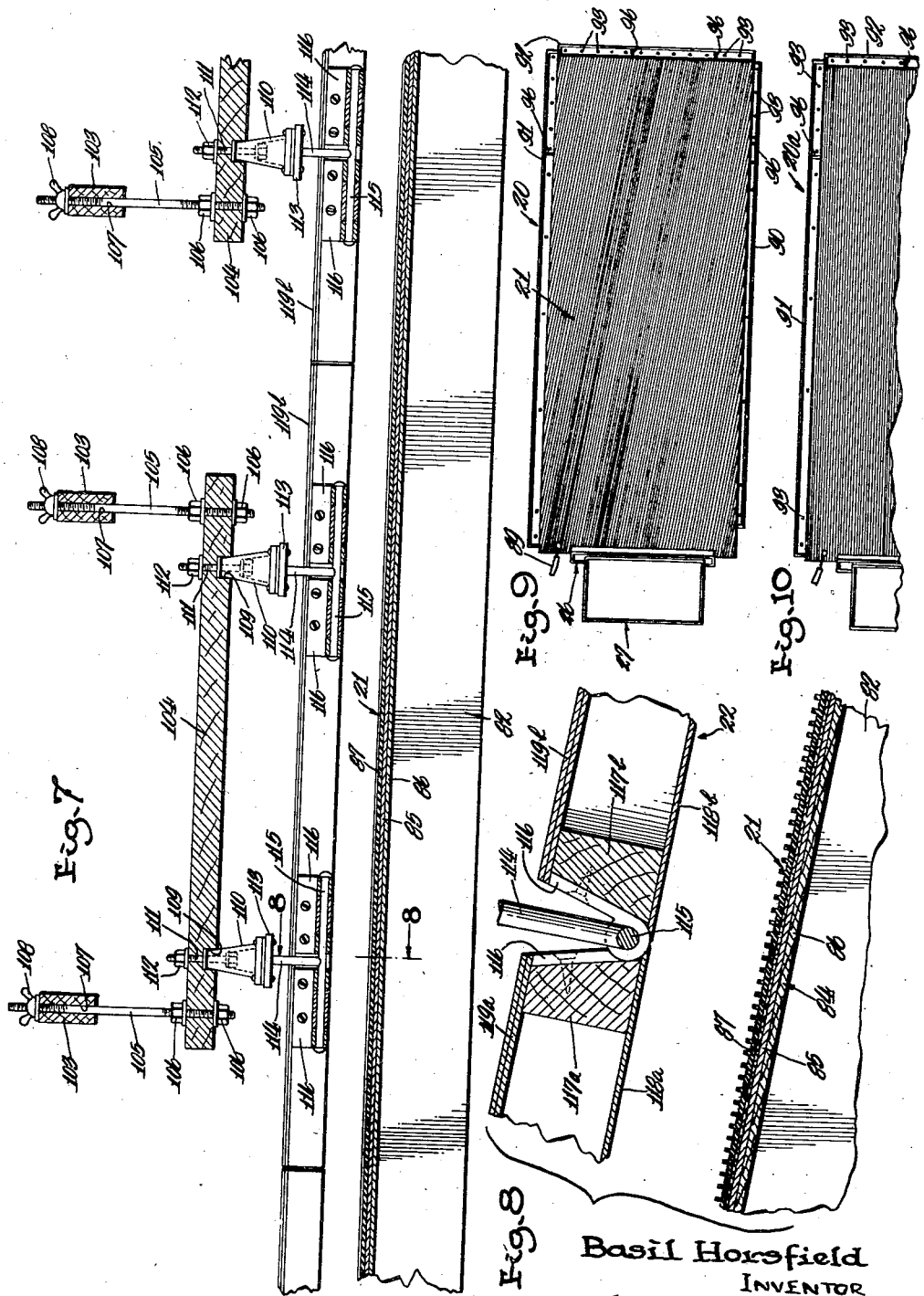

Jan. 1, 1946.  B. HORSFIELD  2,392,044
ELECTROSTATIC SEPARATION OF MATERIAL PARTICLES
Original Filed June 14, 1939  6 Sheets-Sheet 6

Basil Horsfield
INVENTOR
By Freeman Albrecht and Williams
ATTORNEYS

UNITED STATES PATENT OFFICE 2,392,044

ELECTROSTATIC SEPARATION OF MATERIAL PARTICLES

Basil Horsfield, Florence, Ala., assignor to Orefraction Incorporated, Pittsburgh, Pa., a corporation of Pennsylvania Continuation of application Serial No. 279,129, June 14, 1939. This application May 21, 1945, Serial No. 594,829

27 Claims. (Cl. 209—131)

My invention relates to electrostatic separation of material particles, and the principal object of my invention is to provide new and improved methods and apparatus for electrostatically separating material particles.

This application is a continuation of my copending application Serial Number 279,129, filed June 14, 1939.

In the drawings accompanying this specification and forming a part of this application, I have shown, for purposes of illustration, several forms which my invention may assume, and in these drawings:

Figure 1 is a top plan view of apparatus embodying the invention,

Figure 2 is a side elevational view of the apparatus shown in Figure 1,

Figure 15:
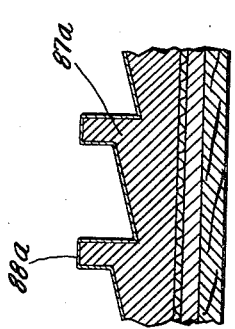
Figure 14:
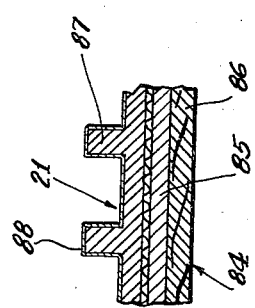
Figure 16:
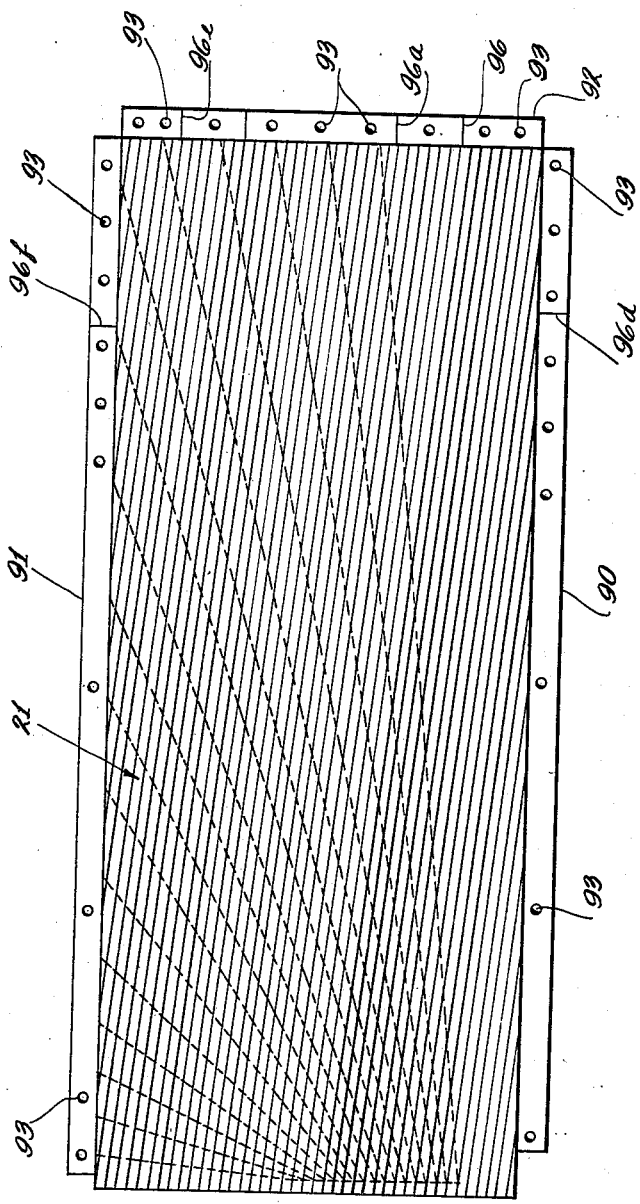

Figure 3 is an end elevational view of the apparatus shown in Figure 1 looking toward the right hand end of the apparatus as considered in Figure 1, Figure 4 is an enlarged transverse vertical sectional view corresponding generally to the line 4—4 of Figure 2, Figure 5 is a fragmentary view analogous to a portion of Figure 4, but showing the parts in elevation and in different positions, this view corresponding generally to the line 5—5 of Figure 2, Figure 6 is a fragmentary sectional view corresponding generally to the line 6—6 of Figure 4, Figure 7 is a fragmentary sectional view corresponding generally to the line 7—7 of Figure 4, Figure 8 is an enlarged fragmentary sectional view corresponding generally to the line 8—8 of Figure 7, Figure 9 is a top plan view, on a smaller scale than Figure 1, of a detail portion, including the lower electrode of the apparatus and certain associated elements, certain parts of the electrode support being omitted, Figure 10 is a fragmentary view, analogous to Figure 9, but showing an electrode of different embodiment, Figure 11 is an enlarged sectional view corresponding generally to the line 11—11 of Figure 2, Figure 12 is an enlarged detail section corresponding generally to the line 12—12 of Figure 2, Figure 13 is an enlarged detail section corresponding generally to the line 13—13 of Figure 2, Figure 14 is a fragmentary cross-sectional view, on an enlarged scale, of a detail of Figure 8, Figure 15 is a view analogous to Figure 14, of a similar detail of different embodiment, and Figure 16 is a diagrammatic view, used in explaining the mode of operation of the apparatus.

Referring first particularly to Figures 1, 2, and 3, the embodiment here shown comprises an elongated table 20, rectangular in plan, and so constructed and arranged as to be agitatable, as will more fully appear.

The table 20 is here shown as including an electrode 21 of plate type. An upper electrode means 22, also of the plate type, overlies and is spaced from the lower electrode 21. The table 20 and upper electrode means 22 are here shown as supported by a cradle 23, in turn supported by a base 24, in such manner as to permit simultaneous adjustment of the general plane of the table and upper electrode means, while at the same time permitting agitation of the table while the upper electrode structure 22 remains in fixed position with respect to the base, as will more fully appear.

Feeding means 25 is provided for feeding to the apparatus co-mingled particles to be separated. For best results the particles of a given feed should be of the same order of size. For example, in the same feed the particles may range in size from say 40 to 200 mesh. However, in proper assortments, material up to ¼ inch or even larger, as well as much finer material, may be handled satisfactorily.

The feeding means 25 is positioned adjacent the left hand end of the apparatus, as viewed in Figures 1 and 2, and includes a trough 26 secured to and movable with the table 20, and a hopper 27 through the lower end of which the particles are fed into the trough 26. A rotatable drum 28 overlies the hopper 27 and receives material from a supply receptacle 29 by means of a bucket elevator 30. The discharge end 31 of the rotatable drum 28 discharges into the hopper 27. The hopper 27 is here shown as provided with an inclined chute or baffle 32, onto which the material from the drum 28 drops.

The lower end of the hopper 27 is desirably provided with spaced discharge openings respectively in communication with pipe nipples 34 through which the particles may be discharged into the trough 26. Any number of these nipples 34 may be blocked, as by stoppers (not shown), to control feeding of material to a selected portion of the lower electrode 21. Material falling into the trough 26 is discharged therefrom, onto the electrode 21, through an aperture or slot 35 in a wall 36 of the trough.

The hopper 27 is carried by a frame 37 suspended by upwardly extending strips 38 which may be secured to a support, as the ceiling of the room, and this frame 37 carries also rollers 39 journalling the rotatable drum 28, while the drum 28 has fixed thereto a gear 40 with which meshes a pinion 41 driven through a worm and worm wheel connection by an electric motor 43.

The drum 28 has a partially closed end 44, which receives material from the bucket elevator 30 through a spout 45, as best seen in Figure 3, the drum 28 has a slight downward inclination toward its discharge end 31, to facilitate the feeding of material. Additionally, the interior of the drum 28 is provided with a spiral vane 46, which acts to positively feed material to the discharge end 31. Extending into the drum 28 from its discharge end 31 is a gas pipe 47, which is formed with a series of openings 48 providing gas jets which may be used when desired or necessary to heat the interior of the drum 28 and the material conveyed by the drum, an exhaust flue 49 is positioned adjacent the partially closed end of the drum, and a slight vacuum may be established in this exhaust flue, to withdraw the products of combustion.

The base 24, as here shown, comprises a pair of spaced main channel beams 50, 51, underlying practically the entire apparatus, the channels of the beams being directed outwardly with respect to each other, as best seen in Figures 3 and 4. These main channel beams are held in spaced relation with respect to each other, and supported from a floor 52, by means of transversely arranged channel beams 53, which are spaced along the length of the main channel beams 50, 51, are of inverted U-shape, and form legs supporting the main channel beams 50, 51. Additional channel beams 54 are interposed longitudinally between the leg beams 53 to hold the latter in proper spaced relation, and the structure may be otherwise braced as may be desired.

The cradle 23, as best shown in Figures 2 and 4, includes pairs of transversely-extending spaced-apart channel bars 59, 60, and disposed between each pair of channel bars 59, 60, are a pair of bearing supporting blocks 61, clamped in position between the respective pairs of channel bars 59, 60, by bolts 62, which serve also to clamp within the right hand channel bar 59 as viewed in Figure 2, and the left hand channel bar 60 as viewed in Figures 2 and 6, a pair of spaced angle-iron cross-pieces 55, 56, also extending transversely of the supporting base 24, and each provided with upwardly extending end portions 57, corresponding ends of which are inter-connected by longitudinally extending angle-iron connecting members 58.

The pairs of channel bars 59, 60, are supported by rockers 63 fastened to the respective pairs of channel bars by bolts 64, and each rocker 63 is provided with an arcuate bearing surface 65 cooperating with a complementary bearing surface 66 provided by bearing members 67 secured to and supported by and between the main channel beams 50, 51. Each rocker 63 also is provided with a pair of downwardly-extending spaced ears 68, and trunnioned between each pair of ears 68 is a nut 69 receiving the screw-threaded end 70 of a shaft 71 journaled in a bearing 72 carried by the main channel beam 50. Fixed to the shafts 71 are bevel gears 73 meshing with corresponding bevel gears 74 carried by a longitudinally extending shaft 75 running alongside the main channel beam 50, and secured to an extension of one of the shafts 71 is a hand wheel 76. By this construction, when the hand wheel 76 is turned, the screw shafts 71 are simultaneously rotated, causing rocking of the rockers 63 in the respective bearing members 67, thus causing corresponding rocking movement of the cradle 23 and the parts carried thereby.

Carried by the upper part of each supporting block 61 is a bearing means 77 comprising a cap member 78 secured to the table 20. Each supporting block 61 may be moved with respect to the respective channel bars 59, 60, by means of bolts 79 threaded through flanges 80 on the supporting blocks 61 and extending loosely through flanges 81 on the bearing means 77. The heads of the bolts 79 bear against the upper surfaces of the respective channels 59, 60, and lock nuts 79a may be provided. It will be evident that the structure above described enables adjustment of the table 20 with respect to the cradle 23.

The table 20 comprises a rectangular frame 82, in this instance made of wooden two-by-four members suitably cross-braced, and including also longitudinally extending intermediate two-by-four members 83 to which the cap members 78 are secured, as shown in Figures 4 and 6. Covering the upper area defined by the wooden frame 82, and suitably fastened to the frame, is a laminated board 84, of the type commercially known as Haskelite, one of the plies of the board being sheet metal 85 (see Figures 8 and 14), and the other ply 86 being wood, the wooden ply 86 being disposed toward the two-by-four frame 82. If desired, the laminated board 84 may be made in sections covering the entire area of the frame 82, and these sections are then desirably electrically interconnected by means of wires or in any other suitable way.

Overlying and covering the entire laminated board 84 is, in this instance, a fabric-backed mat of rubber 87, which may be integral or made of sections, and this rubber mat is suitably cemented to the metal ply 85 of the laminated board 84. The upper surface of the rubber mat 87 is preferably ribbed, as best shown in Figures 8, 9, 10, and 14, but if desired may be otherwise formed to present suitable and desirable irregularities, or may be smooth. If the surface of the mat 87 is ribbed, the ribs may run parallel to a side margin of the table, as shown in Figure 10, but in many instances I prefer that the ribs run at an angle with respect to a side margin of the table, as shown in Figure 9, in which the ribs are shown as at an angle of 10° with respect to the side margins of the table. However, the angle which the ribs make with respect to the side margins of the table may be less than 10°, or may be as much as 20°, or more than 20°.

In the embodiment so far described, aluminum paint 88 (diagrammatically indicated in Figure 14) is spread over the exposed upper surface of the rubber mat 87, thus providing an electrically conductive surface, constituting the lower electrode proper between which the upper electrode means 22 an electrostatic field is adapted to be formed. The fragment of the electrode 21 shown in Figure 14 is on an enlarged scale, the actual thickness of the ribs being $\frac{1}{16}$ of an inch, and the grooves being $\frac{1}{16}$ of an inch wide and $\frac{3}{32}$ of an inch deep.

Where an apparatus is to be used principally for separation of relatively finer materials, and at low angles, an electrode ribbed as shown in Figure 14 has been found to give excellent results, but for larger angles I prefer to use an electrode in which the grooves are so made that the bottoms will be horizontal, or more nearly horizontal, for the angle at which the table is most often used. Such an electrode is shown in Figure 15, and comprises, as in the electrode of Figure 14, a grooved rubber mat 87a, coated with aluminum paint 88a, but in which the bottoms of the grooves make an angle of 16° with the table top, and are therefore horizontal when the table is tilted at an angle of 16° with the horizontal. It will be understood, however, that such an electrode may be used at angles either greater or less than 16°. In the electrode shown in Figure 15 the grooves are 1/4 of an inch wide, 3/32 of an inch deep at the deeper side, and approximately 3/32 of an inch deep at the shallower side, and the ribs are 1/8 of an inch wide, but these dimensions are given merely by way of illustration, and I do not limit myself thereto. Other forms of ribs and grooves will be referred to hereinafter.

The lower electrode 88, and the metal plate 85, are electrically grounded to the supporting frame by means of a wire 89 riveted to the rubber mat 87 and to the laminated board 84. If desired, the mat 87 may be made of any other suitable nonconducting material, and coated with any desirable conducting layer.

As far as the broader aspects of my invention are concerned, the lower electrode may be made with a plane surface, particularly in a table tilted only a small amount, and whether plane or ribbed or with other irregularities, may be made of suitable metal, or of insulating material with sheet metal ribs and grooves thereon, or of metal with ribs of insulating material, or wholly of insulating material, or it may be made in any other suitable way. However, of the different forms of electrodes I have used, I have found that generally an electrode of insulating material provided in a suitable way with a ribbed electrically conductive active surface appears to give the best results.

While the table 20 is tilted transversely, as shown for example in Figure 4, it may be tilted longitudinally, as shown in Figure 2, particularly if the electrode 21 is ribbed. In the case of a table fifteen feet long it has been found satisfactory to adjust the table 20 with respect to the cradle 23, so that the discharge or right hand end of the table as viewed in Figure 2, is approximately two to three inches higher than the left hand or feed end of the table, but these values are given merely by way of example, and I do not limit myself thereto. Raising the discharge end of the table tends to keep the grooves in the electrode 21 full, and tends to keep the material following the grooves under particular conditions of directional agitation of the table 20. However, such longitudinal tilting of the table is not at all essential.

Viewing the parts as shown in Figure 4, the higher margin of the table 20 has secured thereto a relatively small trough 90, which runs longitudinally of that margin, as may be seen in Figures 1, 2, and 9. A relatively larger trough 91 is secured to the lower margin of the table 20, and runs longitudinally of that margin. The end margin of the table 20, opposite the end at which the feed trough 26 is disposed, has secured thereto a trough 92, of substantially the same form as the trough 91, and extending longitudinally of that margin. Each of the troughs 90, 91, 92, is provided with a series of outlet spouts 93, to any desired number of which suitable desirably flexible tubes 94 may be connected and through which the material may be discharged into suitable receptacles 95. As shown in Figures 1 and 4 the troughs may have any desired number of movable partitions 96 separating each trough into the desired number of longitudinal sections. Selected ones of the spouts 93 may be blocked by stoppers 99.

To support the upper electrode means 22 from the cradle 23, each of the longitudinally extending angle bars 58 has secured thereto downwardly extending sleeves 97 best seen in Figures 2, 4, and 13, and loosely received in each sleeve is a threaded rod 98 which extends upwardly, freely through an aperture 100 in the angle bar 58, and is welded to an elongated metal tube 101. Each tube 101 is parallel to and generally coextensive with the side margins of the table 20. A hand wheel 102 is threaded on each of the threaded rods 98. The hand wheels 102 bear against the respective upper surfaces of the angle bars 58, and provide adjustment between the longitudinally extending tubes 101 and the cradle 23.

The upper eelctrode means 22, as here shown, is sectional in construction, and comprises five main sections, transverse with respect to the apparatus as viewed in Figure 1, and each of which is divided on a line longitudinally of the apparatus into two sub-sections which are hinged together.

As is best shown in Figures 4, 5, 7, and 8, each of the main sections comprises two spaced cross strips 103, made of wood or other suitable material, extending transversely of the apparatus, and having portions overlying the longitudinally extending tubes. The strips 103 are spaced a desired distance from the upper surface of the upper electrode means and from the elongated tubes 101, and are adjustably supported by the tubes 101, as will appear hereinafter. Supported from the two cross strips 103 is a hinge-supporting strip 104 of wood or other suitable material, and adjustable hanger bolts 105 extend between the two strips 103 and the hinge-supporting strip 104. Each hanger bolt 105 is threaded, and nuts 106 threaded thereon engage opposite surfaces of the hinge-supporting strip 104, to hold the bolt in place. The upper end of the bolt 105 extends freely through an aperture 107 in its respective cross strip 103 and a wing nut 108 is threaded on the threaded upper end of the hanger bolt 105, to hold the hinge-supporting strip 104 in desired adjusted position. The hinge-supporting strip 104 is spaced from the upper surface of the electrode section which it serves to support, and is formed with spaced-apart notches 109, each notch receiving the upper end of a conical insulator 110, the insulator being hollow, to receive the head of a bolt 111, the upper end of the bolt extending through the hinge-supporting strip 104, and a nut 102 being threaded on the extremity of the bolt 111, to hold the insulator 110 in position. A metal plate 113 is secured to the lower end of each insulator 110, and depending from the metal plate is a rod 114, to the lower extremity of which is welded a transversely extending rod 115, forming a substantially T-arrangement, the transversely extending rod 115 providing a pintle for hinge portions 116.

Each electrode sub-section comprises a rectangular frame of wood or other suitable material, the frame of one of the sections being designated by the reference character 117a, and that of the other by the reference character 117b. The frames may be provided with diagonal bracing pieces 120a, 120b. Suitably secured to the under surface of the frame 117a is a metal plate 118a of substantially the area of the frame, and this metal plate serves as the electrode proper of this sub-section. Ply wood 119a, or other suitable material, is secured to and closes the upper area of the frame 117a. The lower and upper areas of the frame 117b are similarly covered by a metal plate 118b and a cover 119b, respectively. The metal plates 118a, 118b, extend so as to have electrical contact with the hinge portions 116, as best seen in Figure 8, so that the plates 118a, 118b, are electrically connected. The metal plates 118a, 118b, preferably have smooth surfaces.

The outer ends of each electrode section are adjustably supported by the cross strips 103, and for that purpose there are attached to one outer end a pair of spaced-apart insulator blocks 121a, and to the other outer end a pair 121b, one of each pair being seen in Figure 4. The upper parts of the pairs of blocks 121a, 121b, have pivotal connection with slotted bifurcated arms 122a, 122b, respectively, and each bifurcated arm receives the adjacent portion of the respective cross strip 103. Bolts 123a, 123b, pass through the slots in the respective bifurcated arms, through apertures in the respective cross-pieces 103, and these bolts are capable of being tightened, to hold the respective bifurcated arm in desired adjusted position.

Referring particularly to Figure 5, it will be seen that one or both of the sub-sections comprising a main electrode section, may be swung about the pivot 115 of the hinge, Figure 5 showing in full lines one of the sub-sections (118a) of the upper electrode means parallel with respect to the lower electrode 21, and the other sub-section (118b) inclined away from the lower electrode and held in position by the bolt and nut 123b, which clamps the furcations of the arm 122b to the cross-piece 103. Additionally, in dotted lines in Figure 5 is shown a position which an upper electrode main section assumes when the wing nuts 108 on the adjustable hanger bolts 105 are rotated to draw the hinge-supporting strip 104 closer to the cross strips 103, while the outer ends of the main section remain in the position shown in Figure 4, for example, so that the main section, considered as a whole, is closer to the lower electrode at its ends than at the hinge pin 115. On the other hand, of course, the wing nuts 108 can be rotated so that the hinged portions of the sub-sections are closer to the lower electrode than are the ends of the sub-sections, or so that the hinged portion and ends of the sub-sections are equidistant from the lower electrode, or however may be desired.

The cross strips 103 are adjustable with respect to the cradle 23, and to this end the opposite extremities of each cross strip have connected thereto a U-shaped member 124 carrying a depending threaded rod 125. Each rod 125 extends freely through a respective socket 126 carried by and extending through the adjacent tube 101, and a hand wheel 127 is threaded on each rod 125, and bears against the adjacent tube 101, whereby rotation of the proper hand wheels 127 effects desired adjustment of the particular cross piece 103.

From the foregoing it will be evident that the upper electrode means 22 is universally adjustable with respect to the lower electrode 21. Each sub-section may be adjusted with respect to the sub-section hinged thereto, independently of other sections. Each main section may be adjusted as a unit, without disturbing the relative adjustment of the hinged sections forming a part thereof, by adjusting the hand wheels 127 related to that main section. Furthermore such adjustment may be made independently of any other main section. Also, all of the main sections may be simultaneously adjusted, by rotating one or more of the hand wheels 102. By reason of these adjustments the upper electrode means 22 may, if desired, be made to define a plane, and within the limits of adjustment this plane may be made to define any desired angle, transversely or longitudinally, with respect to the lower electrode 21. Furthermore, the distances of points in a plane defined by the upper electrode means from opposite points in the lower electrode may be varied. Furthermore, the upper electrode means 22 may be adjusted so that the general surface contour it presents to the lower electrode is not a plane, but substantially any desired and suitable form of surface contour, and this surface may be adjusted bodily with respect to the lower electrode, without changing said surface contour.

Such adjustments are desirable where it is desired that the strength of the field at different places between the upper and lower electrodes shall be different.

It will be apparent that any one of the upper electrode main sections may be removed from the apparatus by lifting it upwardly, since the rods 125 fit loosely in the sleeves 126. Furthermore, the entire upper electrode means 22 may be bodily removed from the apparatus, by lifting it upwardly, since the rods 98 fit loosely in the tubes 97, and to facilitate removal of the entire upper electrode means 22, the tubes 101 may be provided with eyes 128, to receive the hooks of a hoisting device. However, neither of such removals will disturb any of the adjustments.

Adjacent main sections of the upper electrode means 22 may be electrically connected to each other by flexible jumpers 134 (see Figure 1) which may be conveniently provided with plugs fitting in jacks (not shown) electrically connected to the electrode plates of adjacent sub-sections of adjacent main sections. Thus, since the electrode plates of the sub-sections of each main section are electrically connected, as hereinbefore pointed out, and since the main sections are all connected by the jumpers 134, the electrode plates of all sub-sections are electrically connected, and all may be electrostatically charged by means of a single conductor 135, desirably having a jack connection with one of the sub-sections.

The apparatus operates with great efficiency on double wave rectified electric current, used for charging the electrodes. Various condensers and reactances may be used to filter the rectified current, to produce the particular characteristics of current which are most efficacious on a particular material. However, while a smooth, uniform, direct, or rectified current, is suitable, any suitable form of current may be used.

In the particular apparatus illustrated, the table 20 is reciprocable in its general plane by means of a connecting rod 129 connected to the table and to a reciprocating mechanism contained in a housing 130 carried by the main channel beams 50, 51. The reciprocating mechanism is driven by a pulley 131 having a belt connection with a pulley 132 carried by an electric motor 133, the latter also being supported from the main channel beams. The reciprocating mechanism is desirably so designed that the amplitude of reciprocation may be adjusted. The number of cycles per minute, that is, the number of times per minute that the table is caused to complete a forward and return movement, may of course be varied by changing the speed of the motor 133. I have found that selected amplitudes of reciprocation of from ⅜ of an inch to 1¼ inches, at 290 cycles per minute, are suitable, but under certain conditions it may be desirable to utilize a different amplitude, or a smaller or larger number of cycles per minute. For example, certain conditions may make desirable an amplitude as small as 1/16 of an inch, with a number of cycles from 700 to 1000 per minute. Different amplitudes are desirable for different sizes of material, for the reason that, in general, with a selected voltage applied to the electrode means 21, a smaller amplitude is suitable when separating finer material, whereas, when separating larger size material of the same kind, other factors remaining the same, a larger amplitude is more suitable. When larger size material is being separated it may be desirable, for best results, not only to utilize a larger amplitude than for fine material, but also to apply a higher voltage to the electrode means 21. The larger size material is more difficult to get into flight off the table.

In the particular embodiment illustrated it is desirable that the table be directionally so agitated that particles discharged upon the table from the trough 26 will, by reason of such agitation, progress in general directions having horizontal components in the general plane of the table, that is, they will advance more or less longitudinally of the table, as herein shown, from the feed end of the table away from the feed end of the table, as will more fully appear. The purpose of a table agitated directionally is to continuously convey particles from a point of feed through the electrostatic field, for treatment in the field, the particles being thereafter discharged from the influence of the field and of the conveying means. Consequently, while the table has been hereinabove described as reciprocated in its own plane, it may be agitated by any suitable mechanism, in any suitable way, or I may use any other conveying method or means which will serve this purpose. Nevertheless, whatever conveying method or means may be utilized, agitation in a broader sense is desirable, for the purpose of "milling" the particles about in their respective grooves, so as to bring susceptible particles to the surface of the material in a groove, and enable them more efficiently to go into flight out of the groove, by reason of electrostatic influence, as will more fully appear.

Before setting forth the mode of operation of my invention as embodied in the apparatus of Figures 1 through 15, it may be stated that, in general, a given apparatus embodying my invention is adapted either to rough separate co-mingled particles at a high production rate, by tilting the table of the apparatus to a higher angle, or to fine separate co-mingled particles at a lower production rate, by tilting the table to a lower angle, as will hereinafter more fully appear.

The apparatus disclosed may be operated in various ways, but in order to understand the mode of operation, let it be assumed first that the upper electrode means 22, and the lower electrode 21, are not electrostatically charged, and that material is being fed onto the electrode 21 from the trough 26. It may be stated at this point that the material may be fed to the apparatus at room temperature, or it may be heated and fed to the apparatus at a desired temperature, dependent upon the material to be separated. Let it be further assumed that the electrode 21 is of the type shown in Figure 9 (with electrode ribs either as shown in Figures 14 or 15), and that it is tilted, by means of the cradle 23, so as to make a relatively small angle with the horizontal, say 16°. The material is desirably so fed from the trough 26 that a band of material approximately 10 to 20 inches wide is fed onto the electrode 21 near its upper longitudinal margin. As the table is fed while being directionally agitated, a desired number of grooves are preferably filled with material, but not running over, and by reason of the directional agitation the material in each groove, although it stays in that groove, moves longitudinally in that groove, away from the feed end of the electrode 21. This is diagrammatically illustrated in Figure 16, the grooves in which the material would move and continue to move solely by reason of the directional agitation, being indicated by the full heavy diagonal lines, representative of a band of the diagonal grooves of a table such as shown in Figure 9, the remaining grooves being represented by the full light diagonal lines.

Let it now be assumed not only that particles are being fed onto the electrode 21 as hereinbefore described, but that the electrode means 22 is electrostatically charged to a desired potential, thereby charging the lower electrode 21 and any susceptible particles thereon. The less susceptible particles, being less affected will continue to advance in the grooves into which the particles were fed, but more susceptible particles will rise toward the upper electrode means 22. With the grooves in the electrode 21 running at an angle to the longitudinal axis of the table, as shown in Figure 9, the directional agitation of the table helps, mechanically, to put the susceptible material in flight, by tending to shuffle it over the ribs of the electrode, but not in fact shuffling it over the ribs. When the particles put in flight have lost their charge to the upper electrode, or have failed to reach it, they descend further down the slope of the electrode 21 than particles which were not influenced to any considerable extent.

I have discovered, however, that the particles in ascending appear to move not at 90° to the upper electrode 22, but at some smaller angle, apparently as small as 45°, and also, that the particles after ascending appear to float a considerable distance, so that as a result, a particle lifted from the electrode 21 makes a very considerable movement at each ascent. Such movement may be of the order of several feet or more, and evidently takes place by reason of the action of the inclined electrostatic field provided by the upper and lower electrodes, in conjunction with the force of gravity acting on the floating particles in the inclined field. Since the distance particles may float is considerable, some particles may leave the lower electrode 21 and float substantially directly out of the field into the trough 91, while other particles will float a distance, descend again upon the lower electrode at a lower place, where they possibly may again be advanced in a groove by the directional agitation of the table, but at any rate, sooner or later will be recharged and again float a further distance, and so on until they are finally discharged either into the trough 91 or into the adjacent portion of the trough 92.

The result is that the general direction of progression of more susceptible particles will diverge downwardly of the field with respect to the general direction of progression of less susceptible particles. Thus the less susceptible particles will be discharged into the trough 90, or at a higher point in the trough 92 than more susceptible particles. Thus it will be evident that the particles are "fanned out" over the electrode 21, as diagrammatically indicated by the dotted lines in Figure 16, but it will be understood that more susceptible particles may proceed, by reason of electrostatic influence, from any point of the length of a groove, and out of that groove, so that the representation of Figure 16 is diagrammatic only. However, by reason of the fanning out of the particles, they may be easily segregated into any desired portions, according to their susceptibilities, dependent upon the marginal portion of the electrode 21 from which the selected portions have been discharged. In general, the higher the voltage between the upper and lower electrodes, the more the material will fan out over the table.

It will be understood that ordinarily there are large numbers of particles floating in the field between the upper and lower electrodes, these particles giving an appearance that may be described as a cloud, and by reason of the motions of the particles, the cloud appears to float or roll down the field between the inclined electrodes.

This floating action of the particles, or cloud of particles, is very noticeable when separating, for example, co-mingled particles of zircon and rutile, with the upper electrode set 2¼ inches above the operating surface of the table 20 on the high side throughout its length, and 3 inches from the operating surface on the low side of the table throughout its length, and operating at the rate of about one ton feed per hour, and using a voltage of 20,000. The drift of rutile from the upper edge of the table on the first 2 feet or so of the table down completely over the table and out below the upper electrode into the trough 91, is easily discernible with a powerful flashlight beam. The density of particles is considerably greater near the upper electrode surface than near the table surface. In fact, there are possibly 100 particles, or possibly a higher number of particles, in the air, per cubic inch, within an inch of the upper electrode surface, whereas the number of the particles near the table surface varies from a large number at the top edge of the table, down to a very low number, perhaps 5 or 10 particles per cubic inch, immediately above the bottom edge of the table. Inasmuch as there are so many particles moving it is not possible to certainly identify the movement of an individual particle, but in certain parts of the field it is very plain from observation that the individual particles drift or float as much as 2 feet or more even with the table 20 at a low angle of say 8°. It is also very plain that this drift is caused by the suspension of the particle in an inclined field. If this field is approximately uniform, and is inclined sufficiently, the particles will float great distances, in fact, if the inclination of the field is sufficient, the susceptible particles will leave the lower electrode, go into suspension, and float downwardly between the electrodes clear across the table, into the trough 91 at its lower margin. However, the particular figures mentioned in this paragraph are given merely to afford a better picture of the mode of operation of the apparatus, and not by way of limitation.

Assuming again that material is fed to the table in a band 10 to 20 inches wide near the upper margin of the table 20, and that the table is tilted at a low angle, say about 16° by way of illustration, and that the table is in operation, I have found that in some instances optimum production is secured if the feed of material is more than the amount which can be held by a band of grooves the width of the selected feed band issuing from the trough 26. The overage fed will depend on conditions, and may be approximately 25%. The overage material will roll down the electrode somewhat, into a few lower grooves, and for a certain distance from the feed trough may be mainly gravity controlled overage, but its placement near the point of feed, and its point of discharge, are not entirely gravity controlled, because if the material is coming off of the table, near the bottom corner at the discharge end of the table, for instance, and the apparatus is being operated at a given voltage and temperature of material, the stream which seems to be overfilling the grooves may usually be shifted up or down the table as to its point of discharge, by changing either the voltage or temperature. In general, from the point that material leaves full grooves to the point of its discharge, it is controlled substantially solely either by electrostatic influence, or temperature, or both. By changing the temperature or the potential the material can be fanned out to a thinner wider stream at the place of discharge, or vice versa, or its discharge point may be varied. When overfeeding is employed, the amount of overage feed is more or less critical, and may be found by adjusting the apparatus while running on a given mix.

It will be understood that two or more products may be produced simultaneously, each concentrated for some particular use, but there are always accidentals between any two streams of satisfactory material, which go together to form a middlings product. The middlings product or products can usually be separated if the particles are separate, in themselves, by repassing these products through the apparatus. In like manner the other products, already more or less concentrated, may be further concentrated, if desired or necessary, by repassage through the apparatus.

Assuming, by way of example, that the material fed to the electrode 21 comprises particles of zircon and rutile, the dividers 96a, 96b, as indicated in Figure 16 may be so positioned that under certain conditions of operation the material between the divider 96a and the upper end of the trough 92 is substantially pure zircon, while the material between the divider 96b and the lower end of the trough 92 is substantially pure rutile, as is also the material in the trough 91. The portion of material between the dividers 96a and 96b comprises the middlings, which may contain zircon and rutile in substantially the same proportions as the material initially fed to the electrode 21. If desired, an additional divider, 96c, may be placed between the divider 96a and the upper end of the trough 92, so that then the material between the divider 96c and the upper end of the trough 92, is a grade of zircon better than that between the dividers 96a and 96c, and of course better than the zircon obtained without the divider 96c.

The material received in the trough 90, near the right hand end, as viewed in Figure 16, will be substantially pure zircon, but with the grooves as in Figure 9 the material discharged into the trough 90 further toward the freed end of the electrode 21, may contain a considerable amount of rutile, because the length of the grooves from feed to discharge is relatively short, and consequently, for a given setting of the apparatus, the material has not been treated a sufficient length of time. Therefore, with the grooves as in Figure 9, a divider 96d, or more than one divider, may be placed in the trough 90 at the desired position or positions, to separate the material discharged into the trough 90 into appropriate portions.

Obviously, any desired number of additional dividers, as for example represented by 96e, 96f, may be suitably positioned to obtain different grades of rutile, if desired.

As hereinbefore mentioned, it may be found desirable to heat the material fed to the apparatus, and the temperature to which the material is heated will depend upon the nature of the constituents. However, the temperature of the material may also depend on the proportions of the constituents. For example, in separating a mixture of zircon and rutile, I have found, in many instances, that with a preponderance of rutile, it is desirable that the material be heated to 100° F. or 150° F. The efficiency of separation both as regards quality and quantity, in these instances appears to be much better at these slightly higher temperatures. On the other hand, if zircon predominates in the mix to the extent that the mix appears to the eye to be rather light colored, then apparently the mixture should be run cold, or room temperature, because if the mix is heated, the zircon may be picked up and hang to the upper electrode in long "icicles" which at times reach down and actually touch the stream flowing beneath. These "icicles" are composed of rutile and zircon, and the tips of the "icicles" breaking off and falling into the stream of material below, prevent a consistent separation. At the lower temperatures, this is not so noticeable and in fact is usually absent. It will be understood that the temperatures hereinbefore referred to are given merely by way of illustration, and, accordingly, I do not limit myself to these particular temperatures, since lower or higher temperatures may be found suitable, or necessary, depending upon the circumstances.

In general the material will be subjected to treatment by the apparatus at any temperature that may be found to be suitable to obtain the desired separation, it being of course obvious, particularly if high temperatures are employed, that the electrode carried by the table must be of materials capable of resisting the temperature it is desired to employ.

If desired, roughing and finishing separations may also be carried out on the same table set at the same angle. For example, with a table such as shown and described in connection with Figures 1 through 15, and tilted to a comparatively low angle, say 16°, a roughing separation resulting in relatively pure fractions of zircon and rutile may be obtained by using a potential of 19,000 to 20,000 volts, the table being suitably agitated for rough separation. The fractions may then be fine separated on the same table, set at the same angle, using a potential of from 16,000 to 17,000 volts, the table being suitably agitated for fine separation.

While in the case of the separation of materials comprising two materials, both of which are valuable, as for example zircon and rutile, the roughing operation is made so as to split the two materials advantageously, and both fractions are subsequently finished, in the case of the separation of materials only one of which is valuable, as for example in separating fluorspar from calcite and silica, only one of the fractions is subsequently finished and the roughing operation is so adjusted as to give a minimum fluorspar in the calcite and silica fraction, the latter fraction being tailings or waste. Naturally, the rough fluorspar fraction is then not so pure, but this fraction is then finished to produce pure fluorspar, with again a minimum loss of fluorspar in the tails.

It will be evident from the foregoing that no sharp line can be drawn between tables, on the one hand, either set or constructed for rough separation, and tables, on the other hand, either set or constructed for fine separation. As far as the angle of tilt of the table is concerned, other factors being the same, it appears, from observations, that a highly inclined electrostatic field greatly facilitates the flight of susceptible particles from the top of the electrode 21 into the trough 91 in one hop or flight, or, in general, from a higher to a lower level between the upper and lower electrodes. On the other hand, with a table set at a small angle with the horizontal, apparently the majority of the susceptible particles lifted out of the grooves make a flight toward the lower margin of the table, descend upon the table, and again are put in flight toward the lower margin, until they are deposited either into the trough at the end of the table or into the trough at the lower margin of the table. Generally speaking, starting with a table tilted the least feasible amount, the more the table is tilted, the more particles will leave the table in a single flight, or in a fewer number of flights, other factors being the same.

While for rough separations it is desirable to use a higher voltage in order to obtain large production, it will be apparent that generally less voltage will be required to get the same production on a table at a high angle than on a table at a lower angle.

I have found, moreover, that while I may put a given material through a roughing separation by sufficiently tilting the table, I can also increase the production obtained in a fine or finishing separation by suitably increasing the angle of tilt of the table to an amount less than it would be tilted for a roughing separation, other factors being the same, without sacrificing the quality of separation, and often improving it. By way of example, I have put material through the apparatus with the table tilted to approximately 8°, obtaining a certain poundage per hour, and with the same material fed to the apparatus, but with the table tilted to approximately 10°, I have obtained a poundage per hour double that obtained with the table at approximately 8°. In general, other factors remaining the same, the optimum tilt of the table for greatest production for a given desired separation may be readily determined by simply tilting the table more and more, until the optimum has been obtained. I prefer, however, not to tilt the table so far that the material will begin to cascade over the ribs down the table, by purely mechanical action.

The upper electrode means 22 may be disposed parallel to the lower electrode 21, but it is usually set out of parallel therewith. Depending on the results desired, the electrode means 22 may be disposed either so that it is closer to the lower electrode 21 at the top of the general inclined plane, or closer at the bottom of that plane. The electrode means 22 is also adjustable so that the electrode surface thereof can be brought closer to both edges of the electrode 21, either transversely or longitudinally or both, to better effect a separation between particles whose susceptibilities do not differ much.

If it is desired that the particles be separated into a large number of grades of susceptibility, the upper electrode means 22 may be disposed so that the lower part of the general plane it defines, is further away from the lower part of the electrode 21, than is the upper part of said general plane from the upper part of the electrode 21. In this case the electrostatic field becomes continually weaker towards its lower portion, and control is gained over kinds of particles due to their various susceptibilities as they float through the air between the electrodes to the point where the field is not strong enough to support them. It will of course be understood from what has been stated hereinbefore, that the particles progress in divergent general paths according to their different susceptibilities, and consequently finally reach different places along the margins of the table 20 where they are segregated in the troughs at these margins. However, when the particles to be separated either do not include particles of many different susceptibilities or it is desired to effect separation principally as between definitely more susceptible particles and less susceptible particles, the upper electrode means 22 may be substantially parallel to the electrode 21. For example, where, as in the illustrated apparatus, the table 20 is approximately six feet wide, the upper electrode means 22, may be set so that it is approximately two inches above the electrode 21 at its upper part, and three inches above the electrode 21 at its lower part, throughout the length of the electrodes, and depending on the rate of feed of material and the potential applied to the upper electrode means 22, most of the more susceptible material will be discharged into the trough 91, the less susceptible material being discharged either into the trough 92 or the trough 90 or both, according to the adjustments of the apparatus. The dimensions hereinbefore referred to are purely by way of illustration, and I do not limit myself thereto. It will be understood that any intermediate susceptible material or middlings will be discharged into the marginal troughs at points intermediate the less and more susceptible particles.

In general, the upper electrode means 22, whether or not it be transversely at a uniform distance from the electrode 21, is usually set so that it is at a uniform distance longitudinally. However, at times, particularly when working on a mixture comprising a great amount of more susceptible material, the electrode means 22 is set closer to the electrode 21 at the feed end of the table 20 than at the opposite end, so that the material fed onto the electrode 21 may be spread out over the electrode 21 early in its progression away from the feed end. On the other hand, when working on a mixture comprising a relatively large amount of less susceptible material, the electrode 22 is desirably spaced a greater distance from the electrode 21 at the feed end than at the opposite end, so that the susceptible material is worked out gradually with the least disturbance to the less susceptible material.

Generally speaking the minimum distance of the upper electrode means 22 from the electrode 21 is proportioned to the potential applied to the electrode 22. For example, successful results have been obtained with a minimum electrode distance of approximately one-fourth to one-half an inch, and with an applied potential of 3000 volts; with potentials of from 8000 to 20,000 volts, electrode distances of approximately one inch to approximately two inches have been found suitable. However, these numerical examples are merely illustrative, and I do not limit myself thereto. The potential and electrode distance are, in general, so selected that the desired separation is attained, and is attained with the greatest ease and efficiency.

While various modes of operation and various adjustments have been hereinbefore described, it is to be understood that these are by way of explanation and illustration only, and that the apparatus is susceptible of many other adjustments and modes of operation, as will be apparent from the description of the apparatus itself, and from the illustrative modes of operation set forth.

From the foregoing it will be apparent to those skilled in the art that each of the illustrated methods provides a new and improved method of electrostatically separating material particles, and that each of the illustrated embodiments of apparatus provides a new and improved apparatus for practicing these methods, and accordingly, the methods and apparatus each accomplish the principal objects of my invention. On the other hand, it also will be obvious to those skilled in the art that the illustrated methods and apparatus embodying my invention may be variously changed and modified, or features thereof, singly or collectively, embodied in other combinations than those illustrated, without departing from the spirit of my invention, or sacrificing all of the advantages thereof, and that accordingly, that the disclosure herein is illustrative only, and my invention is not limited thereto.

I claim:

1. The method of separation of material particles, which comprises, positioning the particles on plate-type first electrode means, and subjecting the particles to force operating to move the particles in one direction, and at the same time subjecting the particles to the action of a substantially-continuous relatively-stationary substantially-unidirectional electrostatic field between said first electrode means and cooperating electrode means extending in spaced relation to said first electrode means, said field being of an intensity to levitate particles of higher electrostatic susceptibility and extending downward in a transverse direction, and levitating particles of higher electrostatic susceptibility, and transporting levitated particles transversely, in the lateral direction in which said field extends transversely downward.

2. The method of separation of material particles, which comprises, positioning the particles on plate-type first electrode means, said electrode means extending downward in a transverse direction, and subjecting the particles to force operating to move the particles in a longitudinal direction, and at the same time subjecting the particles to the action of a substantially-continuous relatively-stationary substantially-unidirectional electrostatic field between said first electrode means and cooperating electrode means extending in spaced relation to said first electrode means, said field being of an intensity to levitate particles of higher electrostatic susceptibility and extending downward in a transverse direction, in the same lateral direction in which said first electrode means extends transversely downward, and levitating particles of higher electrostatic susceptibility, and transporting levitated particles transversely, in the lateral direction in which said first electrode means and said field extend transversely downward.

3. The method of separation of material particles, which comprises, positioning the particles on plate-type first electrode means, said electrode means extending downward in a transverse direction, and while restraining the particles from sliding laterally downward, subjecting the particles to force operating to move the particles in a longitudinal direction, and at the same time subjecting the particles to the action of a substantially-continuous relatively-stationary substantially-unidirectional electrostatic field between said first electrode means and cooperating electrode means extending in spaced relation to said first electrode means, said field being of an intensity to levitate particles of higher electrostatic susceptibility and extending downward in a transverse direction, in the same lateral direction in which said first electrode means extends transversely downward, and levitating particles of higher electrostatic susceptibility, and transporting levitated particles transversely, in the lateral direction in which said first electrode means and said field extend transversely downward.

4. The method of separation of material particles, which comprises, positioning the particles on plate-type first electrode means, said electrode means extending downward in a transverse direction, and subjecting the particles to force operating to move the particles in a longitudinal direction, and at the same time subjecting the particles to the action of a substantially-continuous relatively-stationary substantially-unidirectional electrostatic field between said first electrode means and cooperating electrode means also extending downward in a transverse direction, in the same lateral direction in which said first electrode means extends transversely downward, said field being of an intensity to levitate particles of higher electrostatic susceptibility, and levitating particles of higher electrostatic susceptibility, and transporting levitated particles transversely, in the lateral direction in which said first electrode means and said cooperating electrode means extend transversely downward.

5. The method of separation of material particles, which comprises, positioning the particles on plate-type first electrode means, said electrode means extending downward in a transverse direction, and while restraining the particles from sliding laterally downward, subjecting the particles to force operating to move the particles in a longitudinal direction, and at the same time subjecting the particles to the action of a substantially-continuous relatively-stationary substantially-unidirectional electrostatic field between said first electrode means and cooperating electrode means also extending downward in a transverse direction, in the same lateral direction in which said first electrode means extends transversely downward, said field being of an intensity to levitate particles of higher electrostatic susceptibility, and levitating particles of higher electrostatic susceptibility, and transporting levitated particles transversely, in the lateral direction in which said first electrode means and said cooperating electrode means extend transversely downward.

6. The method of separation of material particles, which comprises, positioning the particles on plate-type first electrode means, and subjecting the particles to force operating to move the particles in one direction, and at the same time subjecting the particles to the action of a substantially-continuous relatively-stationary substantially-unidirectional electrostatic field between said first electrode means and cooperating electrode means extending spaced roughly equidistantly from said first electrode means, said field being of an intensity to levitate particles of higher electrostatic susceptibility and extending downward in a transverse direction, and levitating particles of higher electrostatic susceptibility, and transporting levitated particles transversely, in the lateral direction in which said field extends transversely downward.

7. The method of electrostatic separation of material particles according to which such particles are disposed on a support and electrostatic force produced by approximately continuous potential is so applied to them, by an electrostatic field substantially continuous over the support and relatively stationary with respect thereto and which extends from the place of initial support of the particles at a downward angle with respect to the horizontal a distance which is relatively great with respect to the length of the lines of force of said field, that susceptible particles are caused, by the combined action of said field and gravity, to move out of proximity with the support and make a flight in and across said electrostatic field in approximately the direction in which said field extends downwardly at its greatest angle with respect to the horizontal, and either to leave said field and the support in a single such flight or, by again coming into proximity with the support before leaving said field, to leave said field and the support in several such flights, and causing particles while carried by the support to move across said field in a direction transverse to the direction of particles in flight.

8. The method of electrostatic separation of material particles, which comprises initially disposing the particles on a support, applying unidirectional electrostatic force to the particles by an electrostatic field substantially continuous over the support and relatively stationary with respect thereto and of intensity sufficient to cause the resultant electrostatic force on susceptible particles to move them out of proximity with the support, from their initial positions or from subsequent positions on the support, into suspension in said field, and so disposing said electrostatic field that it extends from the place of initial support of the particles at a downward angle with respect to the horizontal a distance which is relatively great with respect to the length of the lines of force of said field so that the action of gravity on suspended particles causes them to move across said field in approximately the direction in which said field extends downwardly at its greatest angle, and leaving the particles free to leave said field and the support in said direction, and causing particles while carried by the support to move across said field in a direction transverse to said direction.

9. The method of separating material particles, which comprises causing particles to be separated to move while on a support in a first direction having a horizontal component while subjecting said particles to a relatively stationary electrostatic field at an angle to the horizontal continuous over the support and providing an electrostatic force at an angle to said first direction of movement and at an angle to the vertical, said force being sufficient to cause susceptible particles to go into suspension in said field and move away from particles moving in said first direction, in a downward direction at an angle to both said first direction and the direction of said electrostatic force so that the particles are distributed in said field in a general plane in which the more susceptible particles are at a lower level than less susceptible particles in accordance with their directions of progression, and leaving the particles free to leave said field and the support in approximately the respective general directions of progression across said field.

10. The method of separating material particles, which comprises causing particles to be separated to move while on a support in a first direction having a horizontal component while subjecting said particles to an electrostatic field at an angle to the horizontal continuous over the support providing an electrostatic force at an angle to said first direction of movement and at an angle to the vertical, said force being sufficient to cause susceptible particles to go into suspension in said field and move away from said moving particles in a downward direction at an angle to both said first direction and the direction of said electrostatic force so that the particles are distributed in said field in a general plane in which the more susceptible particles are at a lower level than less susceptible particles in accordance with their directions of progression, and leaving the particles free to leave said field and the support in approximately the respective general directions of progression across said field, and changing the distribution of particles in said general plane by changing the temperature of the particles.

11. Apparatus for separation of material particles, comprising, plate-type first electrode means, means constructed and arranged to position the particles on said first electrode means, said apparatus being so constructed and arranged that the particles are subject to force operating to move the particles in one direction, cooperating electrode means extending in spaced relation to said first electrode means, means constructed and arranged to maintain between said electrode means a substantially-continuous relatively-stationary substantially-unidirectional electrostatic field of an intensity to levitate particles of higher electrostatic susceptibility, and said electrode means being so constructed and arranged that said field extends downwardly in a transverse direction, and levitated particles are transported transversely, in the lateral direction in which said field extends transversely downward.

12. Apparatus for separation of material particles, comprising, plate-type first electrode means, means constructed and arranged to position the particles on said first electrode means, said apparatus being so constructed and arranged that the particles are subject to force operating to move the particles in one direction, and said first electrode means extending downward in a transverse direction, cooperating electrode means extending in spaced relation to said first electrode means, means constructed and arranged to maintain between said electrode means a substantially-continuous relatively-stationary substantially-unidirectional electrostatic field of an intensity to levitate particles of higher electrostatic susceptibility, and said electrode means being so constructed and arranged that said field extends downwardly in a transverse direction, in the same lateral direction in which said first electrode means extends transversely downward, and levitated particles are transported transversely, in the lateral direction in which said first electrode means and said field extend transversely downward.

13. Apparatus for separation of material particles, comprising, plate-type first electrode means, means constructed and arranged to position the particles on said first electrode means, said apparatus being so constructed and arranged that the particles are subject to force operating to move the particles in one direction, and downward in a transverse direction, and being provided with ribs constructed and arranged to prevent the particles sliding laterally downward, cooperating electrode means extending in spaced relation to said first electrode means, means constructed and arranged to maintain between said electrode means a substantially-continuous relatively-stationary substantially unidirectional electrostatic field of an intensity to levitate particles of higher electrostatic susceptibility, and said electrode means being so constructed and arranged that said field extends downwardly in a transverse direction, in the same lateral direction in which said first electrode means extends transversely downward, and levitated particles are transported transversely, in the lateral direction in which said first electrode means and said field extend transversely downward.

14. Apparatus for separation of material particles, comprising, plate-type first electrode means, means constructed and arranged to position the particles on said first electrode means, said apparatus being so constructed and arranged that the particles are subject to force operating to move the particles in one direction, and said first electrode means extending downward in a transverse direction, cooperating electrode means also extending downward in a transverse direction, in the same lateral direction in which said first electrode means extends transversely downward, means constructed and arranged to maintain between said electrode means a substantially-continuous relatively-stationary substantially-unidirectional electrostatic field of an intensity to levitate particles of higher electrostatic susceptibility, and said electrode means being so constructed and arranged that levitated particles are transported transversely, in the lateral direction in which said first electrode means and said cooperating electrode means extend transversely downward.

15. Apparatus for separation of material particles, comprising, plate-type first electrode means, means constructed and arranged to position the particles on said first electrode means, said apparatus being so constructed and arranged that the particles are subject to force operating to move the particles in one direction, and extending downward in a transverse direction, and being provided with ribs constructed and arranged to prevent the particles sliding laterally downward, cooperating electrode means also extending downwardly in a transverse direction, in the same lateral direction in which said first electrode means extends transversely downward, means constructed and arranged to maintain between said electrode means a substantially-continuous relatively-stationary, substantially-unidirectional electrostatic field of an intensity to levitate particles of higher electrostatic susceptibility, and said electrode means being so constructed and arranged that levitated particles are transported transversely, in the lateral direction in which said first electrode means and said cooperating electrode means extend transversely downward.

16. Apparatus for separation of material particles, comprising, plate-type first electrode means, means constructed and arranged to position the particles on said first electrode means, said apparatus being so constructed and arranged that the particles are subject to force operating to move the particles in one direction, cooperating electrode means extending spaced roughly equidistant from said first electrode means, means constructed and arranged to maintain between said electrode means a substantially-continuous relatively-stationary substantially-unidirectional electrostatic field of an intensity to levitate particles of higher electrostatic susceptibility, and said electrode means being so constructed and arranged that said field extends downwardly in a transverse direction, and levitated particles are transported transversely, in the lateral direction in which said field extends transversely.

17. In combination in apparatus for electrostatic separation of material particles: a first electrode of generally rectangular plate type; means mounting said first electrode so that it is adapted to define a general plane at an angle with respect to the horizontal, and so that two opposite marginal portions of said electrode extend in a generally horizontal direction in said general plane and the other two marginal portions extend transversely of said general direction, and so that one of said transverse marginal portions is adapted to be at a generally lower level than the other of said transverse marginal portions; said first electrode having a plurality of collateral ribs extending in a generally horizontal direction; means for feeding particles onto said first electrode at the lower one of said transverse marginal portions of said electrode; means for subjecting said first electrode to reciprocation in the general direction of said ribs; and a second electrode spaced from said first electrode.

18. In combination in apparatus for electrostatic separation of material particles: a first electrode of generally rectangular plate type; means mounting said first electrode so that it is adapted to define a general plane at an angle with respect to the horizontal, and so that two opposite marginal portions of said electrode extend in a generally horizontal direction in said general plane and the other two marginal portions extend transversely of said general direction; said first electrode being ribbed, the ribs extending in the general direction of said generally horizontal marginal portions; means for subjecting said first electrode to agitation in the general direction of said ribs; means, including a trough extending along at least the lower one of said generally horizontal marginal portions, constructed and arranged to receive particles coming from said one of said generally horizontal marginal portions of said electrode; means for feeding particles onto said electrode at least at a higher portion of one of said transverse marginal portions of said electrode; and a second electrode spaced from said first electrode.

19. In combination in apparatus for electrostatic separation of material particles: a first electrode of generally rectangular plate type; means mounting said first electrode so that it is adapted to define a general plane at an angle with respect to the horizontal, and so that two opposite marginal portions of said electrode extend in a generally horizontal direction in said general plane and the other two marginal portions extend transversely of said general direction; said first electrode being ribbed, the ribs extending in the general direction of said generally horizontal marginal portions; means for subjecting said first electrode to agitation in the general direction of said ribs; means, including a trough extending along at least one of said generally horizontal marginal portions, constructed and arranged to receive particles coming from said one of said generally horizontal marginal portions of said electrode; means for feeding particles onto said electrode at least at a higher portion of one of said transverse marginal portions of said electrode; and a second electrode spaced from said first electrode.

20. In combination in apparatus for electrostatic separation of material particles: first electrode means of the plate type for receiving particles to be separated; second electrode means of the plate type; means for mounting said second electrode means above and spaced from said first electrode means; means for adjusting said second electrode means with respect to said first electrode; and said mounting means being so constructed and arranged that said second electrode means may be disassembled from and reassembled with said first electrode means while leaving said adjustment undisturbed.

21. In combination in apparatus for electrostatic separation of material particles: a first electrode means of plate type for receiving particles to be separated; second electrode means of plate type mounted above and spaced from said first electrode means; means for locally adjusting a portion of said second electrode means relatively to said first electrode means; means for adjusting said second electrode means as a whole relatively to said first electrode means and means for supporting said last-named adjusting means so constructed and arranged that said second electrode means may be disassembled from and reassembled with said first electrode means while leaving said adjustments undisturbed.

22. In combination in apparatus for electrostatic separation of material particles: means for mechanically supporting the particles to be separated; means for subjecting the particles to the action of an electrostatic field which extends from the place of initial support of the particles at a downward angle with respect to the horizontal; said support having a plurality of collateral ribs extending in a generally horizontal direction transverse to said downward angle; and means whereby said support causes particles while carried thereby to positively move in the direction in which said ribs extend.

23. In combination in apparatus for electrostatic separation of material particles: means for mechanically supporting the particles to be separated comprising a transversely inclined table having a plurality of collateral generally longitudinal ribs; means, including an electrode spaced from said table, for subjecting the particles to the action of an electrostatic field which extends from the place of initial support of the particles at a downward angle with respect to the horizontal transversely of said ribs; and means whereby said table is longitudinally reciprocable.

24. Apparatus for electrostatic separation of material particles, comprising: a particle-supporting first electrode of plate type; means mounting said first electrode so that it is adapted to define a general plane at an angle with respect to the horizontal; means, including a second electrode of plate type spaced from said first electrode, constructed and arranged to provide with said first electrode an electrostatic field substantially continuous over said first electrode and extending downwardly at an angle with respect to the horizontal so that susceptible particles in suspension in said field move downwardly across said field; and said first electrode being so constructed and arranged that particles moving across said field in approximately the direction in which said field extends downwardly at its greatest angle with respect to the horizontal are free to leave said field and said first electrode in said direction.

25. Apparatus for electrostatic separation of material particles, comprising: an electrode of plate type; means mounting said electrode so that it is adapted to define a general plane at an angle with respect to the horizontal; means for subjecting said electrode to mechanical force such that particles placed on said electrode tend to move from a first place on said electrode to a second place, on said electrode, spaced from said first place by a distance having a component transverse to the downward angle of said general plane and in said general plane; means for providing an electrostatic field substantially continuous over said electrode for subjecting said particles to electrostatic lines of force relatively stationary with respect to said electrode while said electrode is being subjected to said mechanical forces; said field-providing means being so constructed and arranged that at least the more susceptible particles progress over said general plane in a general direction diverging downwardly with respect to the general direction of progression of less susceptible particles; and said electrode being so constructed and arranged that particles are free to leave said field and said electrode in approximately the respective general directions of progression across said field.

26. Apparatus for electrostatic separation of material particles, comprising: an electrode of plate type having a ribbed surface; means mounting said electrode so that it is adapted to define a general plane extending downwardly at an angle with respect to the horizontal and so that the ribs extend transversely to said downward direction; means for subjecting said electrode to mechanical forces such that particles placed on said electrode tend to move from a first place on said electrode to a second place, on said electrode, spaced from said first place by a distance having a component transverse to the downward angle of said general plane and in said general plane; means for providing an electrostatic field substantially continuous over said electrode for subjecting said particles to electrostatic lines of force relatively stationary with respect to said electrode while said electrode is being subjected to said mechanical forces; said field-providing means being so constructed and arranged that at least the more susceptible particles progress over said general plane in a general direction diverging downwardly with respect to the general direction of progression of less susceptible particles; and said electrode being so constructed and arranged that particles are free to leave said field and said electrode at the places of intersection with the terminal margin of said electrode of the respective general directions of progression across said field.

27. Apparatus for electrostatic separation of material particles, comprising: a first electrode of plate type; means mounting said first electrode so that it is adapted to define a general plane at an angle with respect to the horizontal; means for subjecting said first electrode to mechanical forces such that particles placed on said first electrode tend to move from a first place on said first electrode to a second place, on said electrode, spaced from said first place by a distance having a component transverse to the downward angle of said general plane and in said general plane; means, including a second electrode of plate type spaced from said first electrode, constructed and arranged to provide with said first electrode an electrostatic field substantially continuous over said first electrode and extending downwardly at an angle with respect to the horizontal so that susceptible particles in suspension in said field move downwardly across said field; and said first electrode being so constructed and arranged that particles moving across said field in approximately the direction in which said field extends downwardly at its greatest angle with respect to the horizontal are free to leave said field and said first electrode in said direction.

BASIL HORSFIELD.